United States Patent
Fang et al.

(10) Patent No.: US 12,353,804 B1
(45) Date of Patent: Jul. 8, 2025

(54) ELECTROMAGNETIC FIELD SIMULATION METHOD BASED ON FACE-CENTERED CUBIC AND SUBGRID TECHNIQUE

(71) Applicant: Anhui University, Hefei (CN)

(72) Inventors: Ming Fang, Hefei (CN); Zhenshan Guan, Hefei (CN); Jian Feng, Hefei (CN); Zhixiang Huang, Hefei (CN); Ke Xu, Hefei (CN); Xuesong Deng, Hefei (CN); Yang Shi, Hefei (CN); Donghua Zhou, Hefei (CN); Yihao Li, Hefei (CN); Wei Yang, Hefei (CN)

(73) Assignee: Anhui University, Hefei (CN)

( * ) Notice: Subject to any disclaimer, the term of this patent is extended or adjusted under 35 U.S.C. 154(b) by 0 days.

(21) Appl. No.: 19/006,480

(22) Filed: Dec. 31, 2024

(30) Foreign Application Priority Data

Jan. 5, 2024 (CN) .......................... 202410019009.0

(51) Int. Cl.
*G06F 30/20* (2020.01)
(52) U.S. Cl.
CPC .................... *G06F 30/20* (2020.01)
(58) Field of Classification Search
CPC .................................................... G06F 30/20
See application file for complete search history.

(56) References Cited

U.S. PATENT DOCUMENTS

| | | |
|---|---|---|
| 2015/0324498 A1 | 11/2015 | Izumi et al. |
| 2023/0185995 A1 | 6/2023 | Fang et al. |

FOREIGN PATENT DOCUMENTS

| | | | |
|---|---|---|---|
| CN | 113987792 A | * 1/2022 | ............ G06F 17/15 |
| CN | 114781220 A | 7/2022 | |
| CN | 116894359 A | 10/2023 | |

OTHER PUBLICATIONS

Yang et al "FDTD method for face-centered cube grid for electromagnetic scattering characteristics of object" Systems Engineering & Electronics. Oct. 1, 2021;43(10). (Year: 2021).*
Huang Z, Wu B, Zhang H, Wu X. Parallel implication of 3-D FDTD method in a four-level atomic system. IEEE Journal of Quantum Electronics. Apr. 26, 2012;48(7):908-14. (Year: 2012).*
Wang Kai, Research of NPML Absorption Boundary Conditions and Periodic Boundary Conditions Based on FCC-FDTD Algorithm, China Master's Theses Full-text Database—Science series, Feb. 15, 2021, pp. A005-A599, No. 2 (abstract translated pp. II-III) Claims involved: 1-3,7-10.
Retrieval report-First search dated Aug. 16, 2024 in SIPO application No. 202410019009.0.
Notification to Grant Patent Right for Invention dated Oct. 28, 2024 in SIPO application No. 202410019009.0.
Notice of first Office action dated Aug. 17, 2024 in SIPO application No. 202410019009.0.

* cited by examiner

*Primary Examiner* — Chuen-Meei Gan
(74) *Attorney, Agent, or Firm* — Pilloff Passino & Cosenza LLP; Rachel Pilloff; Sean Passino

(57) ABSTRACT

Provided is an electromagnetic field simulation method based on a face-centered cubic and a subgrid, including setting periodic boundary conditions and a metal plate to construct an electromagnetic field simulation model based on the face-centered cubic, FDTD and the subgrid; through the electromagnetic field simulation model, setting the source point in the subgrid region, selecting the detecting point, simulating the electromagnetic field simulated, and obtaining the moment domain waveform diagram of the electric field in the simulation region.

7 Claims, 7 Drawing Sheets

ELECTROMAGNETIC FIELD SIMULATION METHOD BASED ON FACE-CENTERED CUBIC AND SUBGRID TECHNIQUE

CROSS-REFERENCE TO RELATED APPLICATIONS

This application claims priority to Chinese Patent Application No. 202410019009.0, filed on Jan. 5, 2024, the contents of which are hereby incorporated by reference.

TECHNICAL FIELD

This application belongs to the field of electromagnetic field simulation, and in particular relates to electromagnetic field simulation methods based on face-centered cubic and subgrids.

BACKGROUND

No matter the conventional Cartesian grid or the face-centered cubic grid, the two grids are modeled using a uniform space partition size, when the model structure is relatively fine, the moment consumption and memory occupation required by the simulation will be greatly increased, which seriously impairs the simulation efficiency. In recent years, there are many methods to improve the numerical dispersion, one of which is that a higher order Taylor expansion is used for the differential operator in Maxwell's equations to map to the FDDT algorithm, which is to add more grid points in the grid to constrain the calculation. Although this method may obviously improve the isotropy, the increase of grid points leads to slower calculation speed and the more constraint conditions, making it very complicated to process different coal quality boundaries and difficult to implement. The second method is to change the spectral characteristics of excitation and optimize the dispersion characteristics of specific frequency band and specific Angle by modifying the coefficients of Maxwell's iterative equation. The universality of this method is not high, and other coefficients are needed for different frequency bands and angles. These two improved methods are based on the conventional Cartesian grid. Some researchers have taken a new approach and began to explore new inspiration from the chemical grid structure. According to the theory of chemical structure, they discovered the face-centered cubic (FCC) grid, and then applied the FCC in the electromagnetic field and wave equation, and implemented related simulation. It is found that compared with the conventional Cartesian grid, FCC grids have looser stability conditions and better isotropy. At present, there are few researches on this method at home and abroad, and there are few related literatures. Many essential elements of finite-difference time-domain (FDTD) method need to be studied.

For numerical simulation of models of different sizes, different grid partition sizes need to be selected. Fine grid partitioning will lead to more accurate conclusions, but it will consume a lot of moment and occupy much memory; rough grid partitioning leads to relatively large errors, but the simulation speed is faster and the memory burden is less. Therefore, an electromagnetic field simulation method based on a face-centered cubic and a subgrid is provided.

SUMMARY

To solve the above technical problems, the application provides an electromagnetic field simulation method based on face-centered cubic and subgrid.

To achieve the above purpose, the application provides an electromagnetic field simulation method based on a faced-centered cubic and a subgrid, including:

Based on faced-centered cubic and subgrid, setting periodic boundary conditions and a metal plate up to construct an electromagnetic field simulation model;

through the electromagnetic field simulation model, setting the source point in the subgrid region, and selecting a detecting point to simulate the electromagnetic field.

Optionally, setting the period boundary conditions includes:

Obtaining an updating equation of the face-centered cubic based on the sampling point distribution of the face-centered cubic grid combined with a sampling point distribution of FDTD and the updating equation;

obtaining the structure and constant of the simulation region;

according to a structure and a constant of the simulated region and the updated equation of the face-centered cubic the periodic boundary conditions are generated.

Optionally, setting the metal plate includes:

based on the position of the subgrid and the periodic boundary conditions, the metal plate is arranged vertically on both sides of the subgrid region.

optionally, the method of obtaining the updating equation for the faced-centered cubic is:

for Transverse Electric (TE) mode $$H_z^{n+1/2}(i+\tfrac{1}{4},j+\tfrac{1}{4}) = CP(m) \cdot H_z^{n-1/2}(i+\tfrac{1}{4},j+\tfrac{1}{4}) -$$

$$CQ(m) \cdot \begin{bmatrix} \dfrac{1}{\Delta x}\begin{pmatrix} E_y^n(i+1/2, j+1/2) + E_y^n(i+1/2, j) \\ -E_y^n(i, j+1/2) - E_y^n(i, j) \end{pmatrix} - \\ \dfrac{1}{\Delta y}\begin{pmatrix} E_x^n(i, j+1/2) + E_x^n(i+1/2, j+1/2) \\ -E_x^n(i, j) + E_x^n(i+1/2, j) \end{pmatrix} \end{bmatrix}$$

$$CP(m) = \frac{\mu(m)/\Delta t - \sigma_m(m)/2}{\mu(m)/\Delta t + \sigma_m(m)/2}$$

$$CQ(m) = \frac{1}{\dfrac{\mu(m)}{\Delta t} + \dfrac{\sigma_m(m)}{2}}$$

where CP(m) is a first coefficient, CQ (m) is a second coefficient, Hz is a value of the magnetic field in a z direction, i is a coordinate in an x direction, j is a y direction coordinate, $E_y$ is a y direction electric field value, $E_x$ is an x direction electric field value, $\Delta x$ is a size of a grid in an x direction, $\Delta y$ is a size of a grid in a y direction, σ (m) is a conductivity in position m, om is a magnetoconductivity, $\Delta t$ is a moment step, and p is a magnetoconductivity coefficient.

for Transvers Magnetic (TM) mode:

$$E_z^{n+1}(i,j) = CA(m) \cdot E_z^{n+1}(i,j) -$$

$$CB(m) \cdot \begin{bmatrix} \dfrac{1}{\Delta x}\begin{pmatrix} H_y^{n+1/2}(i+1/4, j+1/4) + H_y^{n+1/2}(i+1/4, j-1/4) \\ -H_y^{n+1/2}(i-1/4, j+1/4) - H_y^{n+1/2}(i-1/4, j-1/4) \end{pmatrix} - \\ \dfrac{1}{\Delta y}\begin{pmatrix} H_x^{n+1/2}(i+1/4, j+1/4) + H_x^{n+1/2}(i+1/4, j+1/4) \\ -H_x^{n+1/2}(i+1/4, j-1/4) + H_x^{n+1/2}(i-1/4, j-1/4) \end{pmatrix} \end{bmatrix}$$

$$CA(m) = \frac{\varepsilon(m)/\Delta t - \sigma_m(m)/2}{\varepsilon(m)/\Delta t + \sigma_m(m)/2}$$

-continued $$CB(m) = \frac{1}{\varepsilon(m)/\Delta t + \sigma_m(m)/2}$$

where CA(m) is a third coefficient, CB(m) is a fourth coefficient, $E_z$ is an electric field value in a z direction, $H_y$ is a value of a magnetic field in a y direction, $H_x$ is a value of a magnetic field in an x direction, n is a space step, n−1 represents a space step at a previous moment, n+1 represents a space step at a next moment, n−½ represents a space step of a first half moment, n+½ represents a space step of a second half moment;

Optionally, $E_x$ and $E_y$ in the TE mode are:

$$E_x^{n+1}(i,j) = CA(m) \cdot E_x^n(i,j) +$$

$$CB(m) \cdot \frac{1}{\Delta y} \begin{bmatrix} H_z^{n+1/2}(i+1/4, j+1/4) + H_z^{n+1/2}(i+1/4, j+1/4) - \\ H_z^{n+1/2}(i+1/4, j-1/4) + H_z^{n+1/2}(i-1/4, j-1/4) \end{bmatrix}$$

$$E_y^{n+1}(i,j) = CA(m) \cdot E_y^{n+1}(i,j) +$$

$$CB(m) \cdot \frac{1}{\Delta x} \begin{bmatrix} (H_z^{n+1/2}(i+1/4, j+1/4) + H_z^{n+1/2}(i+1/4, j-1/4) - \\ H_z^{n+1/2}(i-1/4, j+1/4) - H_z^{n+1/2}(i-1/4, j-1/4)) \end{bmatrix}$$

Optionally, $H_x$ and $H_y$ in the TM mode are:

$$H_x^{n+1/2}(i+1/4, j+1/4) = CP(m) \cdot H_x^{n-1/2}(i+1/4, j+1/4) -$$

$$CQ(m) \cdot \frac{1}{\Delta y} \begin{bmatrix} E_z^n(i+1/2, j+1/2) + E_z^n(i+1/2, j) - \\ E_z^n(i, j+1/2) - E_z^n(i, j) \end{bmatrix}$$

$$H_y^{n+1/2}(i+1/4, j+1/4) = CP(m) \cdot H_y^{n-1/2}(i+1/4, j+1/4) -$$

$$CQ(m) \cdot \frac{1}{\Delta x} \begin{bmatrix} E_z^n(i+1/2, j+1/2) + E_z^n(i+1/2, j) - \\ E_z^n(i, j+1/2) - E_z^n(i, j) \end{bmatrix}$$

Where $H_x$ and $H_y$ are a magnetic field values in an x direction and a y direction respectively.

Optionally, simulation of electromagnetic fields includes:

S1, placing the subgrid region based on the simulation region;

S2, initializing the electric field and magnetic field components of the coarse and fine grids;

S3, obtaining the electric field component of the coarse grid at the next moment based on the surface center cubic and the initialized electric field component of coarse grid;

S4, the electric field component of the coarse grid at the next moment is transferred to the fine grid by linear interpolation, and the electric field component and magnetic field component of the fine grid at the next moment are obtained based on the size of the coarse grid of the faced-centered cubic;

S5, the magnetic field component of the fine grid at the next moment is weighted to obtain the magnetic field component of the coarse grid at the next moment of the junction;

S6, based on the face-centered cubic, the magnetic field component of the coarse grid at the next moment is obtained; if the iteration moment is greater than the preset iteration moment, it is the end; otherwise, return to S3.

Optionally, linear interpolation is used to transfer the next moment electric field component of coarse grid to the fine grid, including:

$$e_{x1} = E_{x1}$$

$$e_{y1} = E_{y1}$$

$$e_{x2} = \frac{1}{2}(E_{x1} + E_{x2})$$

$$e_{y2} = \frac{1}{2}(E_{y1} + E_{y2})$$

where $e_{x1}$ and $e_{x2}$ are the first and second electric field values in the x direction of the fine grid respectively, $E_{x1}$ and $E_{x2}$ are the first and second electric field values in the x direction of the coarse grid respectively, $e_{y1}$ and $e_{y2}$ are the first and second electric field values in the y direction of the fine grid respectively, $E_{y1}$ and $E_{y2}$ are the first and second electric field values in the y direction of the coarse grid respectively.

Optionally, linear interpolation is used to pass the next moment electric field component of coarse grid after the fine grid, including:

the magnetic field of the fine grid is processed:

$$H_z = \frac{1}{4}(h_{z1} + h_{z2} + h_{z3} + h_{z4})$$

Where $H_z$ is the z direction magnetic field value of the coarse grid, $h_{z1}$, $h_{z2}$, $h_{z3}$ and $h_{z4}$ are the first, second, third and fourth magnetic field values in the z direction of the fine grid respectively.

Optionally, simulation of the electromagnetic field also includes:

waveform is obtained based on the source point;

the moment domain waveform is obtained by the detecting point according to the waveform, and the simulation result is verified.

The beneficial effects of the application are:

the application applies the subgrid in the FCC grid, the fine part of the simulation adopts the fine grid partitioning, the updating equation is simple, and the simulation efficiency is obviously improved; the method may reduce the moment consumption and memory occupation required by FCC algorithm simulation in the simulation process, and improve the simulation efficiency.

BRIEF DESCRIPTION OF THE DRAWINGS

For more clearly describing the technical scheme in the embodiments of the application or the prior art, the drawings required for use in the embodiments are briefly introduced below. Obviously, the drawings described below are only embodiments of the application, and other drawings may be obtained from them without creative labor by persons of ordinary skill in the art.

DETAILED DESCRIPTION OF THE EMBODIMENTS

Figure 1:
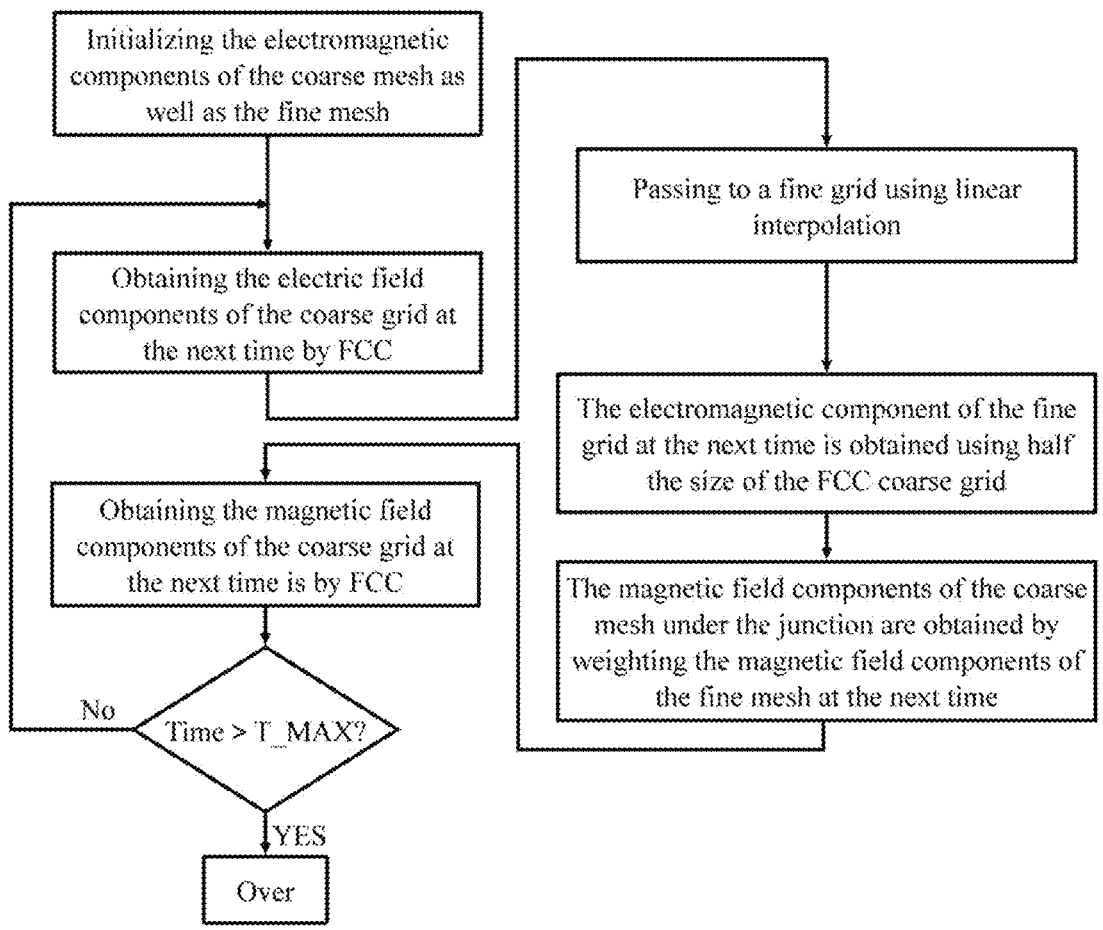
FIG. 1 is a flow chart of electromagnetic field simulation method based on face-centered cubic and subgrid in embodiments of the application.

The following is a clear and complete description of the technical scheme in the embodiments of the application in combination with the drawings. Obviously, the described embodiments are only a part of the embodiments of the application, but not the whole embodiments. Based on the embodiments of the applications, all other embodiments obtained by ordinary technicians in the art without making creative labor fall within the scope of protection of the application.

In order to make the above purposes, features and advantages of the application more obvious and understandable, the application is further explained in detail in conjunction with the drawings and specific embodiments.

As shown in FIGS. 1-7, the embodiment provides an electromagnetic field simulation method based on face-centered cubic and subgrids, including:

based on FCC finite-difference moment-domain and subgrid, the electromagnetic field simulation model is constructed by setting periodic boundary conditions and adding metal plates, the constructed simulation model is used to obtain the moment-domain waveform diagram of the electric field in the simulation region by setting source points in the subgrid region and selecting detecting points;

in the process of constructing the electromagnetic field simulation model, based on the distribution of sampling points in the FCC grid, the updating equation of the complete conductor boundary form FCC is obtained through the conventional FDTD sampling point distribution and the updating equation;

based on the various structures and constants of the simulation region, the periodic boundary conditions are generated according to the derived FCC updating equation.

In the process of building an electromagnetic field simulation model, the simulation process of the model includes the following steps:

the subgrid region is placed based on simulation region;

the electric field and magnetic field components of coarse grid and fine grid are initialized;

the electric field components of the coarse grid at the next moment are obtained based on the face-centered cubic and the initialized electric field components;

the electric field component of the coarse grid is transferred to the fine grid by linear interpolation;

the electromagnetic component of the fine grid at the next moment is obtained using half the size of the FCC coarse grid;

the magnetic field components of the coarse grid under the junction are obtained by weighting the magnetic field components of the fine grid at the next moment;

the magnetic field component of the coarse grid at the next moment is obtained by FCC and the whether to end the cycle or not is judged by moment.

In the process of constructing the electromagnetic field simulation model, by setting the position and periodic boundary conditions of the subgrid, two metal plates are placed vertically on both sides of the subgrid region;

the moment domain waveform of reflection field may be obtained by setting the metal plate.

In the process of constructing the electromagnetic field simulation model, by setting the location of the subgrid and the metal plate, the point source is selected and placed in the center region where the subgrid and the metal plate are vertical;

selecting the probe point according to the point source location.

In the process of building the electromagnetic field simulation model, the updating equation of two-dimensional FCC is derived through Maxwell equation:

TE mode includes formulas (1)-(7):

$$H_z^{n+1/2}(i+\tfrac{1}{4},j+\tfrac{1}{4})=CP(m)\cdot H_z^{n-1/2}(i+\tfrac{1}{4},j+\tfrac{1}{4})-$$

$$CQ(m)\cdot\begin{bmatrix}\dfrac{1}{\Delta x}\left(\begin{array}{c}E_y^n(i+1/2,j+1/2)+E_y^n(i+1/2,j)\\-E_y^n(i,j+1/2)-E_y^n(i,j)\end{array}\right)-\\ \dfrac{1}{\Delta y}\left(\begin{array}{c}E_x^n(i,j+1/2)+E_x^n(i+1/2,j+1/2)\\-E_x^n(i,j)+E_x^n(i+1/2,j)\end{array}\right)\end{bmatrix} \quad (1)$$

$$CP(m)=\dfrac{\mu(m)/\Delta t-\sigma_m(m)/2}{\mu(m)/\Delta t+\sigma_m(m)/2} \quad (2)$$

$$CQ(m)=\dfrac{1}{\dfrac{\mu(m)}{\Delta t}+\dfrac{\sigma_m(m)}{2}} \quad (3)$$

where $H_z$ is a z direction magnetic field value, i is a x-direction coordinate, and j is a y direction coordinate, the CP (m) is a first coefficient, the CQ (m) is a second coefficient, $E_y$ is a y direction electric field value, $E_x$ is a x direction electric field value, $\Delta x$ is a size of a grid in a x direction, $\Delta y$ is a size of the grid in a y direction, om is a magnetoconductivity, $\Delta t$ is a moment step, n is a space step, n−1 represents a space step at a previous moment, n+1 represents a space step at a next moment; n−½ represents a space step of a first half moment, n+½ represents a space step of a second half moment.

For $E_x$ and $E_y$, getting that:

$$E_x^{n+1}(i,j)=CA(m)\cdot E_x^n(i,j)+$$

$$CB(m)\cdot\dfrac{1}{\Delta y}\begin{bmatrix}H_z^{n+1/2}(i+1/4,j+1/4)+H_z^{n+1/2}(i+1/4,j+1/4)-\\ H_z^{n+1/2}(i+1/4,j-1/4)+H_z^{n+1/2}(i-1/4,j-1/4)\end{bmatrix} \quad (4)$$

$$E_y^{n+1}(i,j)=CA(m)\cdot E_y^n(i,j)+$$

$$CB(m) \cdot \frac{1}{\Delta x} \quad (5)$$

$$[(H_z^{n+1/2}(i+1/4, j+1/4) + H_z^{n+1/2}(i+1/4, j-1/4) -$$
$$H_z^{n+1/2}(i+1/4, j-1/4) - H_z^{n+1/2}(i-1/4, j-1/4)]$$

$$CA(m) = \frac{\varepsilon(m)/\Delta t - \sigma(m)/2}{\varepsilon(m)/\Delta t - \sigma(m)/2} \quad (6)$$

$$CB(m) = \frac{1}{\varepsilon(m)/\Delta t + \sigma(m)/2} \quad (7)$$

where CA(m) is a third coefficient, CB(m) is a fourth coefficient, ε(m) is a dielectric constant at a m position, and σ(m) is a conductivity at a m position.

Similarly, TM pattern includes formulas (8)-(10):

$$E_z^{n+1}(i,j) = CA(m) \cdot E_z^{n+1}(i,j) -$$

$$CB(m) \cdot \begin{bmatrix} \frac{1}{\Delta x} \left( H_y^{n+\frac{1}{2}}\left(i+\frac{1}{4}, j+\frac{1}{4}\right) + H_y^{n+\frac{1}{2}}\left(i+\frac{1}{4}, j-\frac{1}{4}\right) - \\ H_y^{n+\frac{1}{2}}\left(i-\frac{1}{4}, j+\frac{1}{4}\right) - H_y^{n+\frac{1}{2}}\left(i-\frac{1}{4}, j-\frac{1}{4}\right) \right) - \\ \frac{1}{\Delta y} \left( H_x^{n+\frac{1}{2}}\left(i+\frac{1}{4}, j+\frac{1}{4}\right) + H_x^{n+\frac{1}{2}}\left(i-\frac{1}{4}, j+\frac{1}{4}\right) - \\ H_x^{n+\frac{1}{2}}\left(i+\frac{1}{4}, j-\frac{1}{4}\right) + H_x^{n+\frac{1}{2}}\left(i-\frac{1}{4}, j-\frac{1}{4}\right) \right) \end{bmatrix} \quad (8)$$

where $E_z$ is an electric field value in a z direction, $H_y$ is a magnetic field value in a y direction, and $H_x$ is a value of the magnetic field in a x direction.

$H_x$ and $H_y$ are:

$$H_x^{n+1/2}(i+\frac{1}{4}, j+\frac{1}{4}) = CP(m) \cdot H_x^{n-1/2}(i+\frac{1}{4}, j+\frac{1}{4}) -$$

$$CQ(m) \cdot \frac{1}{\Delta y} \begin{bmatrix} (E_z^n(i+1/2, j+1/2) + E_z^n(i, j+1/2) - \\ E_z^n(i+1/2, j) - E_z^n(i, j)) \end{bmatrix} \quad (9)$$

$$H_y^{n+1/2}(i+\frac{1}{4}, j+\frac{1}{4}) = CP(m) \cdot H_y^{n-1/2}(i+\frac{1}{4}, j+\frac{1}{4}) -$$

$$CQ(m) \cdot \frac{1}{\Delta x} \begin{bmatrix} (E_z^n(i+1/2, j+1/2) + E_z^n(i+1/2, j) - \\ E_z^n(i, j+1/2) - E_z^n(i, j)) \end{bmatrix} \quad (10)$$

Where $H_x$ and $H_y$ are a magnetic field values in a x direction and a y direction respectively, $H_x^{n-1/2}$ is a value of a magnetic field in a x direction at a previous moment.

After obtaining an updating equation of a two-dimensional FCC, when the ratio of coarse to fine grids placed in the simulation region is 2:1, the field value exchange from the coarse grid to the subgrid region is realized by linear interpolation of the electric field of the coarse grid at the intersection line position to the electric field of the fine grid at the corresponding position of the subgrid. The mode of linear interpolation may be described by the following equations (11)-(14):

$$e_{x1} = E_{x1} \quad (11)$$

$$e_{y1} = E_{y1} \quad (12)$$

$$e_{x2} - \frac{1}{2}(E_{x1} + E_{x2}) \quad (13)$$

$$e_{y2} - \frac{1}{2}(E_{y1} + E_{y2}) \quad (14)$$

where $e_{x1}$ and $e_{x2}$ are a first electric field value and a second electric field value in the x direction of the fine grid respectively, $E_{x1}$ and $E_{x2}$ are the first electric field value and a second electric field value in the x direction of the coarse grid respectively, $e_{y1}$ and $e_{y2}$ are a first electric field value and a second electric field value in the y direction of the fine grid respectively, $E_{y1}$ and $E_{y2}$ are a first electric field value and a second electric field value in the y direction of the coarse grid respectively.

Obtaining the coefficient of linear interpolation according to the distance, and the interpolation of the electric field component in the y direction is the same as that in the x direction. However, since the magnetic field corresponding to the coarse grid of the FCC fine grid is replaced by the electric field of the fine grid, the magnetic field of the fine grid needs to be processed in a certain way, which is described according to the following formula (15):

$$H_z = \frac{1}{4}(h_{z1} + h_{z2} + h_{z3} + h_{z4}) \quad (15)$$

where $H_z$ is a magnetic field value in a z direction of the coarse grid, $h_{z1}$, $h_{z2}$, $h_{z3}$ and $h_{z4}$ are a first, second, third and fourth magnetic field values in the z direction of the fine grid respectively.

After obtaining the messages of each process in the simulation region, generating a waveform through the source point, and obtaining a required moment domain waveform at the detecting point, which is convenient to verify the correctness of the result in the later stage.

According to the technical scheme, the application has the following technical effects:

In the simulation process, the technical scheme reduces the moment consumption and memory occupation required by the simulation and improves the simulation efficiency. As the ratio of the FCC moment value of FCC added to the subgrid and that of FCC not added to the subgrid is 1:4, 86.39% may be improved. This method aims to reduce the moment consumption and memory occupation of FCC algorithm simulation and improve the simulation efficiency when simulating fine models. Starting from the face-centered cubic grid, the updating equation of FCC grid is given first, and then the subgrid is combined with it to provide an interpolation method different from the conventional FDTD subgrid; finally, according to the characteristics of subgrid, a weighting method for the boundary magnetic field of coarse and fine grid is given. Finally, in order to verify the accuracy of the proposed algorithm, a simulation surface example with metal plate is presented. The proposed method is proved accurate by comparing the moment-domain waveforms of the detecting points in the simulation region with different updating methods.

The simulation method is shown in FIG. 1, including steps 01-07:
01, initializing the electromagnetic components of the coarse grid as well as the fine grid;
02, obtaining the electric field components of the coarse grid at the next moment by FCC;
03, passing to a fine grid using linear interpolation;

04, obtaining the electromagnetic component of the fine grid at the next moment obtained by using half the size of the FCC coarse grid;

05, by weighting the magnetic field components of the fine grid at the next moment, obtaining the magnetic field components of the coarse grid at the next moment;

06, obtaining the magnetic field components of the coarse grid at the next moment by FCC;

07, checking whether the cycle is ended or not based on the moment. If the cycle is not ended, return to Step 02.

In this embodiment, starting from Maxwell's equations:

In the two-dimensional case, Maxwell's moment-domain equations for TE mode are shown in the formula (16):

$$\left.\begin{aligned}\frac{\partial E_x}{\partial t} &= \frac{1}{\varepsilon}\left(\frac{\partial H_z}{\partial y} - \sigma E_x\right) \\ \frac{\partial E_y}{\partial t} &= \frac{1}{\varepsilon}\left(-\frac{\partial H_z}{\partial x} - \sigma E_y\right) \\ \frac{\partial H_z}{\partial t} &= \frac{1}{\mu}\left(\frac{\partial E_x}{\partial y} - \frac{\partial E_y}{\partial x} - \sigma_m H_z\right)\end{aligned}\right\} \quad (16)$$

Maxwell's moment domain equations for TM mode are as shown in the formula (17):

$$\left.\begin{aligned}\frac{\partial H_x}{\partial t} &= \frac{1}{\mu}\left(-\frac{\partial E_z}{\partial y} - \sigma_m E_x\right) \\ \frac{\partial H_y}{\partial t} &= \frac{1}{\mu}\left(-\frac{\partial E_z}{\partial x} - \sigma_m E_y\right) \\ \frac{\partial E_z}{\partial t} &= \frac{1}{\varepsilon}\left(\frac{\partial H_y}{\partial x} - \frac{\partial H_y}{\partial y} - \sigma H_z\right)\end{aligned}\right\} \quad (17)$$

where $E_x$ is a x direction electric field value, $E_y$ is a y direction electric field value, $E_z$ is a z direction electric field value, $H_x$ is a x direction magnetic field value, $H_y$ is a y direction magnetic field value, $H_z$ is a z direction electric field value; $\varepsilon$ is a dielectric constant, $\mu$ is a magnetoconductivity coefficient, $\sigma$ is a conductivity, and $\sigma_m$ is a magnetoconductivity.

Figure 2:
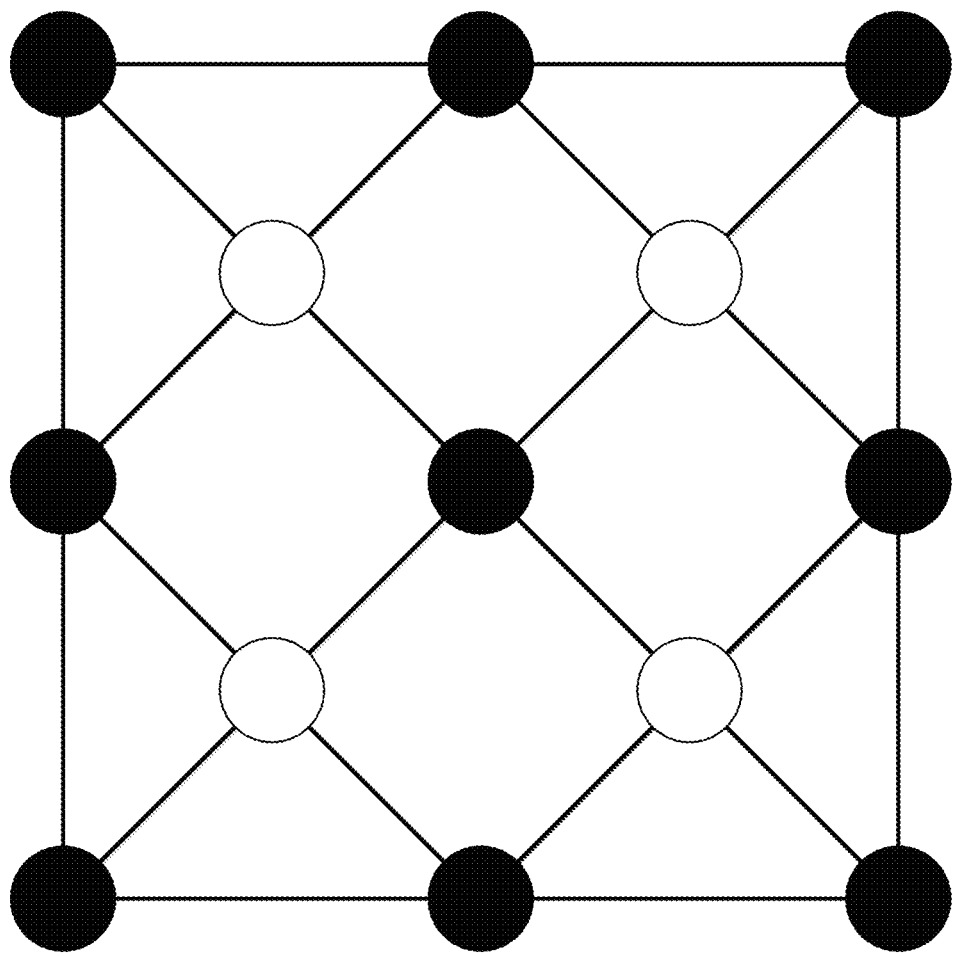
FIG. 2 is a grid structure diagram of the two-dimensional FCC embodiment of the application.
Figure 3:
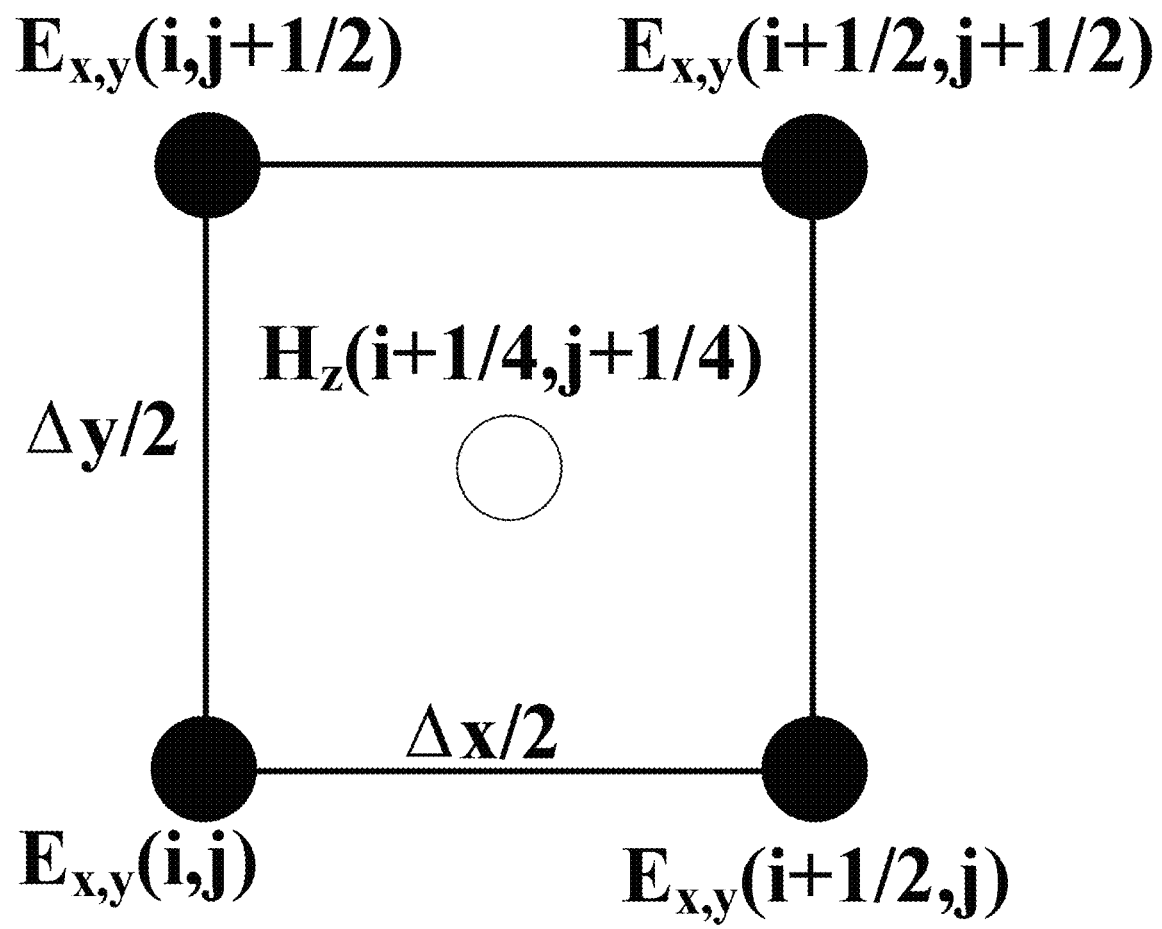
FIG. 3 is a schematic diagram of ¼ two-dimensional FCC cell of the embodiment of the application.

FIG. 2 shows the distribution of sampling points in the two-dimensional FCC grid: A FDTD grid contains four FCC grids, the electric fields of the FCC grid are distributed at four vertices of the FCC grid, so there are 9 magnetic fields of FCC grid distributed in a FDTD grid, and the magnetic fields of FCC grid are distributed in the middle of FCC grid, and there are 4 magnetic fields distributed in an FCC grid;

Taking TE mode Hz component equation for example, the discrete scheme of FCC-FDTD is analyzed. For convenience, ¼ two-dimensional FCC cells (Four electric fields surround a magnetic field in the middle) are taken as shown in FIG. 3, the moment deflection is discretized directly by the central difference method, while the space deflection guide first uses the average of each party to the midpoint, and then performs central difference, for example, in the x direction, $E_y(i+½,j)$ and $E_y(i+½,j+½)$ are averaged to get $E_y(i+½,j+¼)$; and then $E_y(i,j)$ and $E_y(i,j+½)$ are averaged to get $E_y(i,j+¼)$. Finally the last two values are subtracted and then divided by the spatial interval $\Delta x/2$ to obtain the partial derivative in the x direction, and the same applies to the y direction. Finally, discrete iterative formula of $H_z$ is obtained. The formulas (1)-(7) above are applicable for TE mode, and the formulas (8)-(10) above are applicable for r TM mode.

Figure 4:
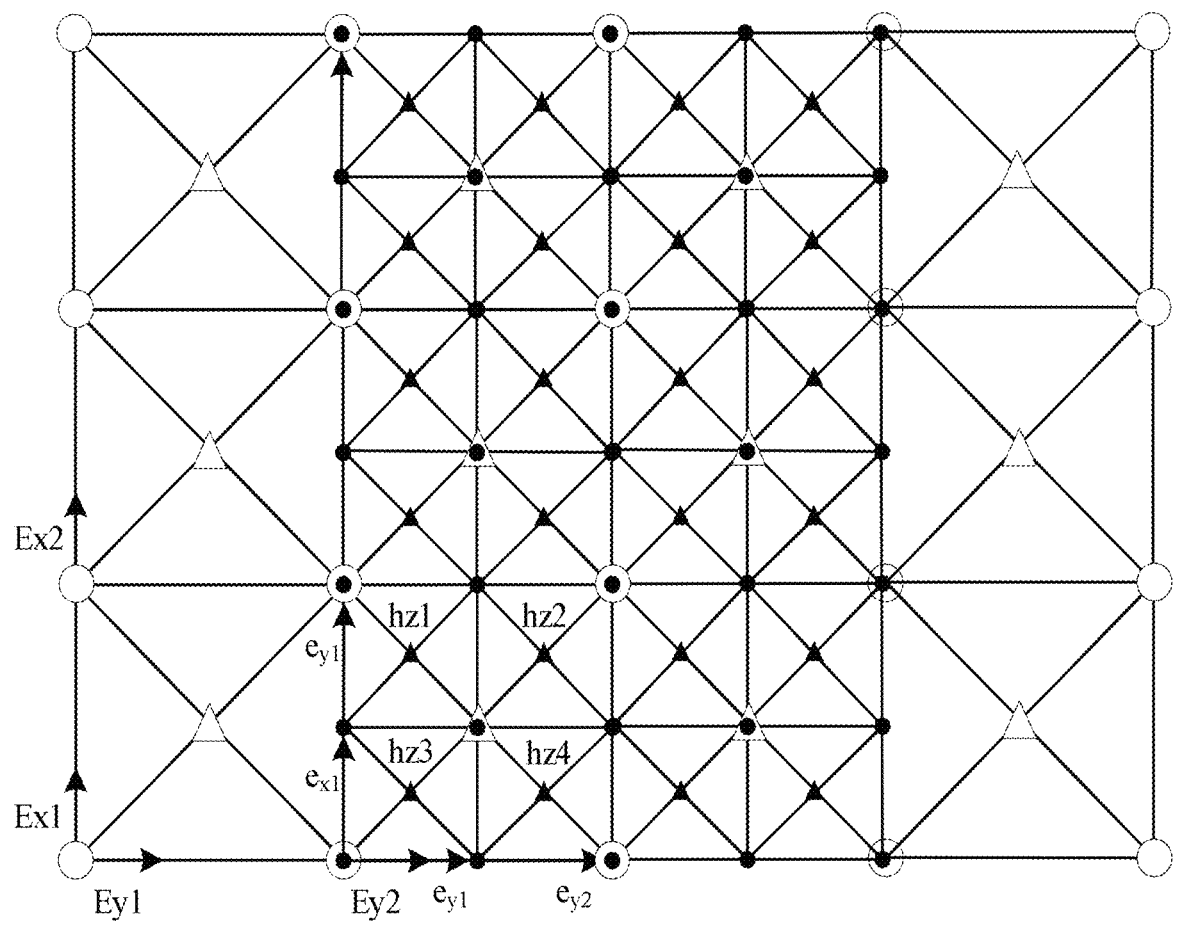
FIG. 4 is a schematic diagram of electromagnetic field distribution at the junction of coarse and fine grids of the embodiment of the application.

The method of the application is shown in FIG. 4.

The conventional FDTD algorithm usually uses a uniform Yee grid to partition the specific target. When the target is too small, a finer grid is needed to partition the specific target, so the whole simulation process consumes more moment and occupies more memory. The FCC subgrid used in this embodiment does not need to update the electric field and magnetic field of the coarse grid in the entire simulation region, but only needs to set the fine grid in the specified region for electric field and magnetic field iteration. Since the sampling points of FCC grid are different from those of FDTD, the interpolation processing of FCC is different from that of FDTD. The interpolation method used in this embodiment is shown in FIG. 3:

When the ratio of coarse to fine grids placed in the simulation region is 2:1, the field value exchange between the coarse grid and the subgrid region is realized by linear interpolation between the coarse grid electric field at the intersection boundary and the fine grid electric field at the corresponding position of the subgrid, the linear interpolation method may be described by the above formulas (11)-(14).

The coefficient of linear interpolation is obtained according to the distance, the interpolation method of the electric field component in the y direction is the same as that in the x direction. However, because the magnetic field of the coarse grid corresponding to the FCC fine grid is replaced by the electric field of the fine grid, the magnetic field of the fine grid needs to be processed to a certain extent, and the processing method is described in accordance with the above formula (15).

Figure 5:
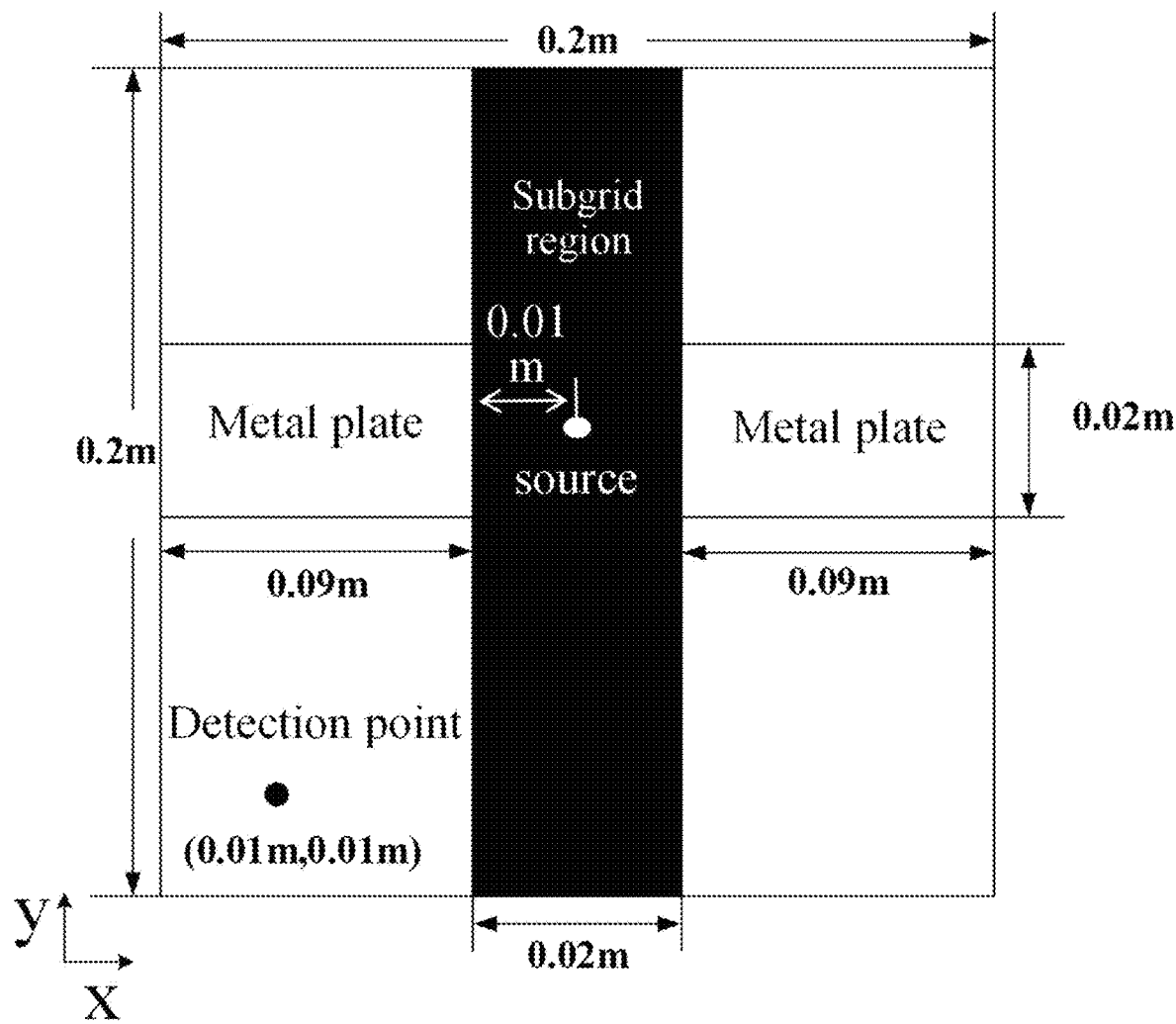
FIG. 5 shows the simulation region of the embodiment of the application and the specific distribution diagram of the subgrid and metal plate.
Figure 6:
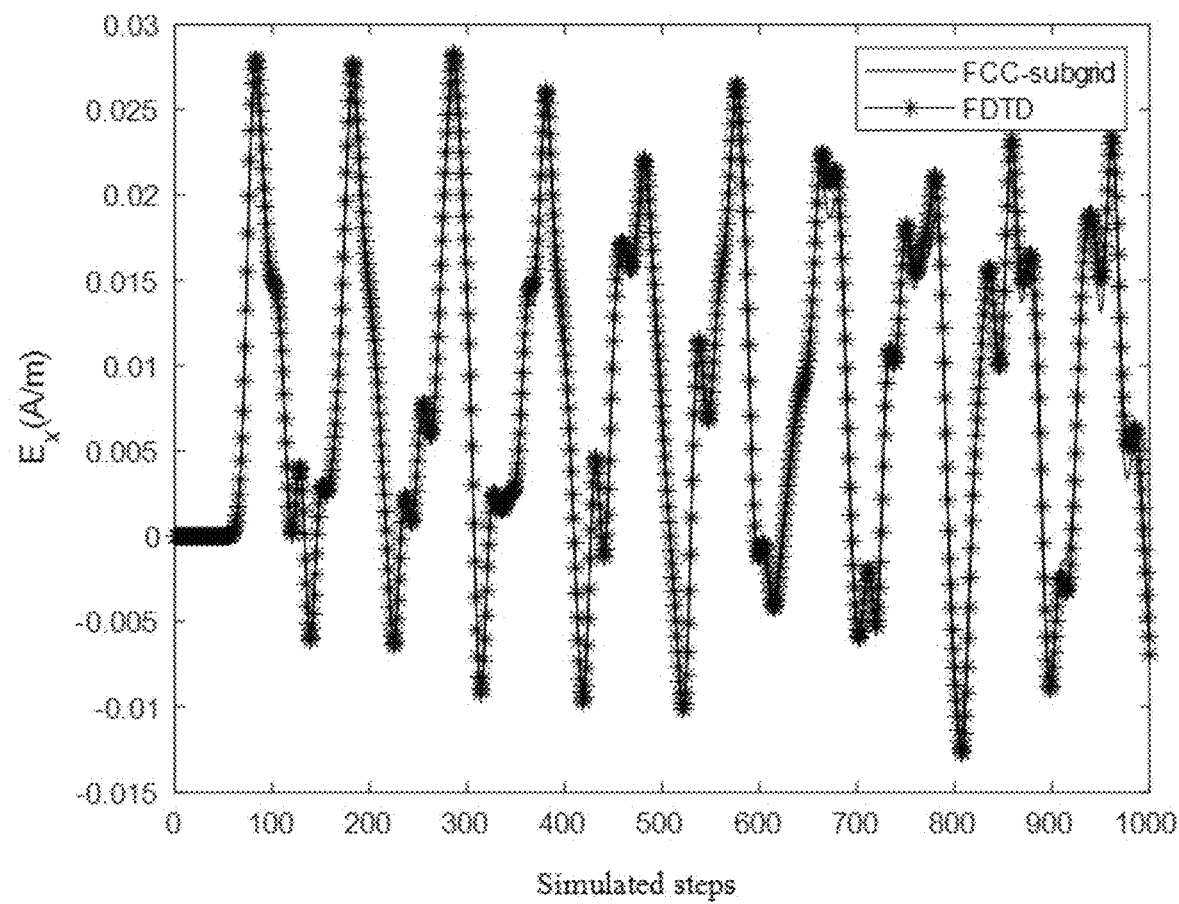
FIG. 6 is a comparison diagram of component moment-domain waveforms obtained by FCC subgrid and FDTD simulation detecting points respectively in embodiments of the application.
Figure 7:
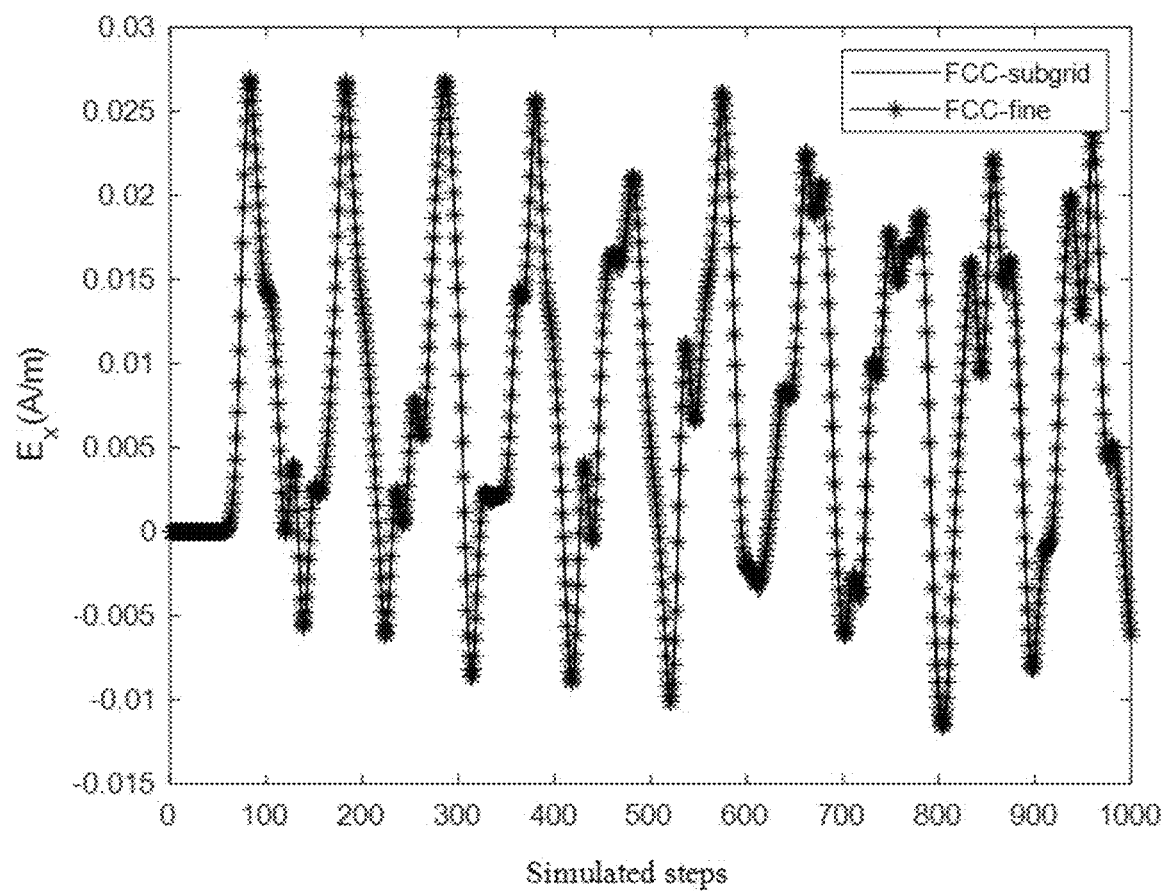
FIG. 7 is a comparison diagram of component moment domain waveforms obtained respectively by FCC subgrid and FCC simulation detecting points of embodiments of the application.

In order to prove the algorithm is correct, this embodiment takes the simulation region structure with a metal plate for example, and uses the conventional FDTD, FCC fine grid and the algorithm proposed in this embodiment to calculate the moment domain waveform of the detecting points in the simulation region with metal plate respectively. The specific sizes are shown in FIG. 5, The left and right sides of the 0.2 m*0.2 m resonator are respectively added with metal plates with a width of 0.02 m. The sizes of the coarse grid are $9.9931*10^{-4}$ m, the sizes of the fine grid are $4.9965*10^{-4}$ m, and the ratio of the coarse to fine grid is 2:1. The calculated number of coarse grids is 200*200 minus 2*20*90 as the number of PEC plates, and the calculated number of fine grids is 40*400, whose Boundary Condition is set as Periodic Boundary Condition. Gaussian excitation source is added in the middle of the fine grids region, and the pulse width is $\tau=5.0*10^{-11}$, $t_0=2.25*10^{-10}$;

It can be seen from FIG. 6 and FIG. 7 that the method provided by the application is consistent with the waveform obtained by the conventional FDTD method. Although there are some differences in some parts due to different iterative updating equations of the two methods, the overall results provided by the application are correct, which effectively verifies the method provided by the application is correct. To be safe, the results of the method provided by the application are also compared with the results of the FCC algorithm of fine grid partitioning. It can be seen that the results of the calculation method provided by the application are better in agreement with the results of the FCC algorithm of the fine grid than the results of the conventional FDTD of the fine grid, thus more verifying the good accuracy of the algorithm provided by the application.

In order to clearly state the advantages of the method provided by the application in saving moment, Table 1 shows the comparison result between the method provided by the application and the conventional FCC calculation moment. The moment is recorded by iterating 100 steps at 2 intervals, and the average moment is taken.

TABLE 1

|  | FCC (1:2 comparison) | FCC (1:3 comparison) | FCC (1:4 comparison) | The grid ratio of the method of the application = 1:2 | The grid ratio of the method of the application = 1:3 | The grid ratio of the method of the application = 1:4 |
| --- | --- | --- | --- | --- | --- | --- |
| Number of grid point | 6e3 | 9e3 | 12e3 | 3e3 | 3e3 | 3e3 |
| Iteration steps | 1e2 | 1e2 | 1e2 | 1e2 | 1e2 | 1e2 |
| Average time (s) | 1.9313614 | 4.2804278 | 7.4374206 | 0.4922964 | 0.494175 | 0.4995656 |

It can be seen from the table that when the grid ratio is 1:4, the algorithm provided by the application can save 93.28% of the calculation moment compared with the FCC grid.

The above embodiments are only some embodiments of the application, and do not limit the scope of the application. Under the premise of not deviating from the design spirit of the application, all kinds of changes and improvement of the technical schemes made by ordinary technicians in the field shall fall within the scope of protection determined by the claims of the application.

What is claimed is:

1. An efficient three-dimensional electromagnetic field simulation method for simulating fine grides based on a face-centered cubic (FCC) and a subgrid, comprising:
   based on the faced-centered cubic and the subgrid, setting periodic boundary conditions and a metal plate, and constructing an electromagnetic field simulation model;
   setting a source point in a subgrid region through the electromagnetic field simulation model, selecting a detecting point, and simulating an electromagnetic field;
   wherein setting the periodic boundary conditions comprises:
   obtaining an updating equation of the face-centered cubic based on sampling point distribution of the face-centered cubic grid combined with the sampling point distribution of finite-difference time-domain (FDTD) and the updating equation;
   obtaining a structure and a constant of a simulation region;
   generating the periodic boundary conditions according to the structure and the constant of the simulation region and the updating equation of the faced-centered cubic;
   for a transverse magnetic (TM) mode:

$$E_z^{n+1}(i,j) = CA(m) \cdot E_z^{n+1}(i,j) -$$

$$CB(m) \cdot \begin{bmatrix} \frac{1}{\Delta x} \begin{pmatrix} H_y^{n+1/2}(i+1/4, j+1/4) + H_y^{n+1/2}(i+1/4, j-1/4) - \\ H_y^{n+1/2}(i-1/4, j+1/4) - H_y^{n+1/2}(i-1/4, j-1/4) \end{pmatrix} - \\ \frac{1}{\Delta y} \begin{pmatrix} H_x^{n+1/2}(i+1/4, j+1/4) + H_x^{n+1/2}(i-1/4, j+1/4) - \\ H_x^{n+1/2}(i+1/4, j-1/4) + H_x^{n+1/2}(i-1/4, j-1/4) \end{pmatrix} \end{bmatrix}$$

$$CA(m) = \frac{\varepsilon(m)/\Delta t - \sigma(m)/2}{\varepsilon(m)/\Delta t - \sigma(m)/2}$$

$$CB(m) = \frac{1}{\varepsilon(m)/\Delta t + \sigma(m)/2}$$

wherein $CA(m)$ is a third coefficient, $CB(m)$ is a fourth coefficient, $E_z$ is an electric field value in a z direction, $H_y$ is a value of a magnetic field in a y direction, $H_x$ is a value of a magnetic field in an x direction, n is a space step, n−1 represents a space step at a previous moment, n+1 represents a space step at a next moment, n−½ represents a space step of a first half moment, n+½ represents a space step of a second half moment, (m) is a dielectric constant at a position m, σ(m) is a conductivity at the position m, and $\Delta t$ is a moment step;
$H_x$ and $H_y$ in the TM mode are:

$$H_x^{n+1/2}(i+1/4, j+1/4) = CP(m) \cdot H_x^{n-1/2}(i+1/4, j+1/4) -$$

$$CQ(m) \cdot \frac{1}{\Delta y} \begin{bmatrix} (E_z^n(i+1/2, j+1/2) + E_z^n(i, j+1/2) - \\ E_z^n(i+1/2, j) - E_z^n(i, j)) \end{bmatrix}$$

$$H_y^{n+1/2}(i+1/4, j+1/4) = CP(m) \cdot H_y^{n-1/2}(i+1/4, j+1/4) -$$

$$CQ(m) \cdot \frac{1}{\Delta x} \begin{bmatrix} (E_z^n(i+1/2, j+1/2) + E_z^n(i+1/2, j) - \\ E_z^n(i, j+1/2) - E_z^n(i, j)) \end{bmatrix}$$

wherein $CQ(m)$ is a second coefficient, i is a coordinate in an x direction, j is a coordinate in a y direction, $\Delta x$ is a grid size in the x direction, $\Delta y$ is a grid size in the y direction, and $CP(m)$ is a first coefficient
wherein simulating the electromagnetic field comprises:
S1, placing the subgrid region based on the simulation region;
S2, initializing an electric field component and a magnetic field component of coarse and fine grids,
S3, obtaining an electric field component of the coarse grid at a next moment based on the FCC and an initialized the electric field component of the coarse grid;
S4, transferring the electric field component of the coarse grid at the next moment to the fine grid by a linear interpolation, and obtaining an electric field component and a magnetic field component of the fine grid at the next moment based on a size of the coarse grid of the FCC,
S5, weighting the magnetic field component of the fine grid at the next moment to obtain a magnetic field component of the coarse grid at a next moment of a junction to reduce moment consumption and memory occupation of FCC, and
S6, based on the FCC obtaining the magnetic field component of the coarse grid at the next moment, and ending if an iteration moment is greater than a preset iteration moment; otherwise, returning to the S3.

2. The electromagnetic field simulation method based on a face-centered cubic and a subgrid according to claim 1, wherein setting the metal plate comprises:

arranging the metal plate vertically on both sides of the subgrid region based on a position of the subgrid and the periodic boundary conditions.

3. The electromagnetic field simulation method based on a face-centered cubic and a subgrid according to claim 1, wherein updating the equation of the face-centered cubic is obtained by:

for transverse electric (TE) mode:

$$H_z^{n+1/2}(i+\tfrac{1}{4},j+\tfrac{1}{4}) = CP(m) \cdot H_z^{n-1/2}(i+\tfrac{1}{4},j+\tfrac{1}{4}) -$$

$$CQ(m) \cdot \begin{bmatrix} \dfrac{1}{\Delta x}\left(\begin{array}{c} E_y^n(i+1/2,j+1/2) + E_y^n(i+1/2,j) - \\ E_y^n(i,j+1/2) - E_y^n(i,j) \end{array}\right) - \\ \dfrac{1}{\Delta y}\left(\begin{array}{c} E_x^n(i,j+1/2) + E_x^n(i+1/2,j+1/2) - \\ E_x^n(i,j) + E_x^n(i+1/2,j) \end{array}\right) \end{bmatrix}$$

$$CP(m) = \frac{\mu(m)/\Delta t - \sigma_m(m)/2}{\mu(m)/\Delta t - \sigma_m(m)/2}$$

$$CQ(m) = \frac{1}{\dfrac{\mu(m)}{\Delta t} + \dfrac{\sigma_m(m)}{2}}$$

wherein the CP(m) is the first coefficient, the CQ(m) is the second coefficient, $H_z$ is the value of the magnetic field in the z direction a, i is the coordinate in the x direction, j is the y direction coordinate, $E_y$ is the electric field value in the y direction, $E_x$ is the electric field value in the x direction, $\Delta x$ is the size of the grid in the x direction, $\Delta y$ is the size of the grid in the y direction, $\sigma_m$ is the magnetoconductivity, $\Delta t$ is the moment step, and $\mu$ is the magnetoconductivity coefficient.

4. The electromagnetic field simulation method based on a face-centered cubic and a subgrid according to claim 3, wherein the $E_x$ and the $E_y$ in the TE mode are:

$$E_x^{n+1}(i,j) = CA(m) \cdot E_x^n(i,j) +$$

$$E_x^{n+1}(i,j) = CA(m) \cdot E_x^n(i,j) +$$

$$CB(m) \cdot \frac{1}{\Delta y}\begin{bmatrix} (H_z^{n+1/2}(i+1/4,j+1/4) + H_z^{n+1/2}(i-1/4,j+1/4) - \\ H_z^{n+1/2}(i+1/4,j-1/4) - H_z^{n+1/2}(i-1/4,j-1/4)) \end{bmatrix}$$

$$E_y^{n+1}(i,j) = CA(m) \cdot E_y^n(i,j) +$$

$$CB(m) \cdot \frac{1}{\Delta x}\begin{bmatrix} (H_z^{n+1/2}(i+1/4,j+1/4) + H_z^{n+1/2}(i+1/4,j-1/4) - \\ H_z^{n+1/2}(i-1/4,j+1/4) - H_z^{n+1/2}(i-1/4,j-1/4)) \end{bmatrix}.$$

5. The electromagnetic field simulation method based on a face-centered cubic and a subgrid according to claim 1, wherein transferring the electric field component of the coarse grid at the next moment to the fine grid by a linear interpolation comprises:

$$e_{x1} = E_{x1}$$

$$e_{y1} = E_{y1}$$

$$e_{x2} = \frac{1}{2}(E_{x1} + E_{x2})$$

$$e_{y2} = \frac{1}{2}(E_{y1} + E_{y2})$$

wherein $e_{x1}$ and $e_{x2}$ are a first electric field values and a second electric field values in an x direction of the fine grid respectively, $E_{x1}$ and $E_{x2}$ are a first electric field value and a second electric field value in an x direction of the coarse grid respectively, $e_{y1}$ and $e_{y2}$ are a first electric field value and a second electric field value in the y direction of the fine grid respectively, and $E_{y1}$ and $E_{y2}$ are a first electric field value and a second electric field value in the y direction of the coarse grid respectively.

6. The electromagnetic field simulation method based on a face-centered cubic and a subgrid according to claim 1, wherein transferring the electric field component of the coarse grid at the next moment to the fine grid by a linear interpolation is followed by:

processing a magnetic field of the fine grid:

$$H_z = \frac{1}{4}(h_{z1} + h_{z2} + h_{z3} + h_{z4})$$

wherein the $H_z$ is a magnetic field value in a z direction of the coarse grid, and $h_{z1}$, $h_{z2}$, $h_{z3}$, and $h_{z4}$ are first, second, third and fourth magnetic field values in a z direction of the fine grid respectively.

7. The electromagnetic field simulation method based on a face-centered cubic and a subgrid according to claim 1, wherein simulating electromagnetic field is also followed by:

obtaining a waveform based on setting the source point in the subgrid region; and obtaining a moment domain waveform by the detecting point according to the waveform, and verifying a simulation result.

* * * * *